Jan. 30, 1945. A. M. ALEXANDRESCU 2,368,437
AUTOMATIC CENTRIFUGAL HYDRAULIC FLYWHEEL
Filed Jan. 23, 1942 3 Sheets-Sheet 1

Inventor
A. M. Alexandrescu
by Wilkinson &
Mawhinney
Attorneys.

Jan. 30, 1945. A. M. ALEXANDRESCU 2,368,437
AUTOMATIC CENTRIFUGAL HYDRAULIC FLYWHEEL
Filed Jan. 23, 1942 3 Sheets-Sheet 2

Inventor
A. M. Alexandrescu
By Wilkinson & Mawhinney
Attorneys.

Jan. 30, 1945.  A. M. ALEXANDRESCU  2,368,437
AUTOMATIC CENTRIFUGAL HYDRAULIC FLYWHEEL
Filed Jan. 23, 1942  3 Sheets-Sheet 3
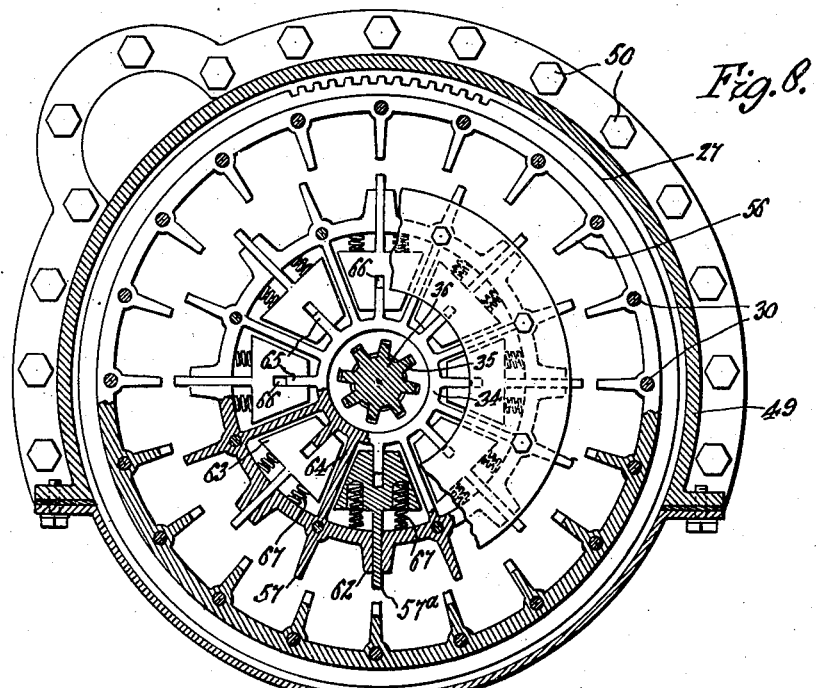
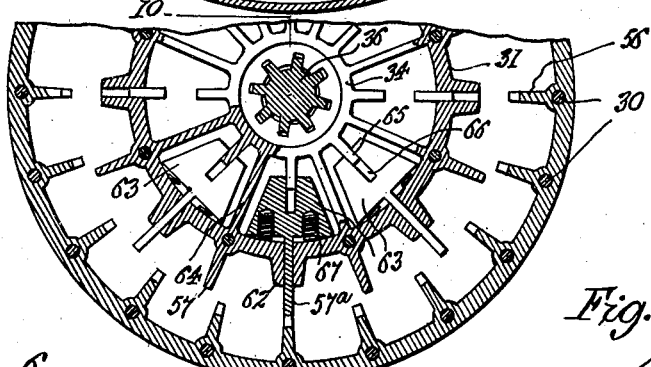
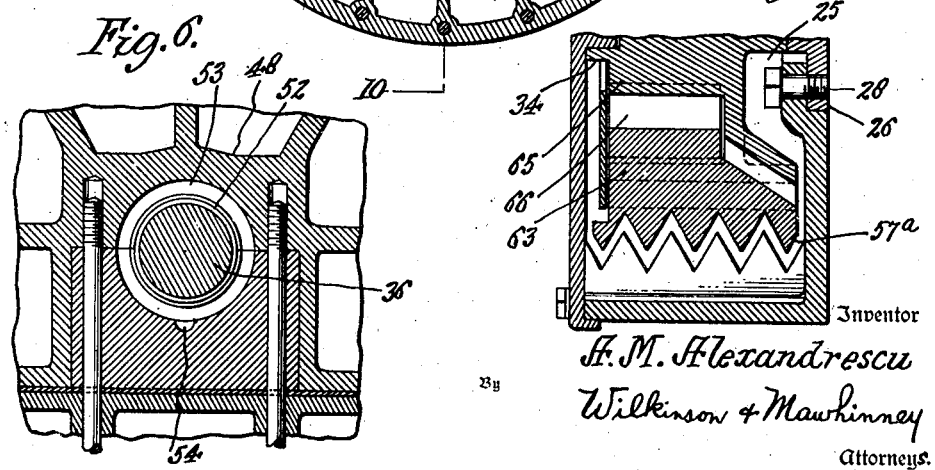
Inventor
A. M. Alexandrescu
By Wilkinson & Mawhinney
Attorneys.

Patented Jan. 30, 1945

2,368,437

UNITED STATES PATENT OFFICE 2,368,437

AUTOMATIC CENTRIFUGAL HYDRAULIC FLYWHEEL

Alexander M. Alexandrescu, Cleveland, Ohio

Application January 23, 1942, Serial No. 427,998

3 Claims. (Cl. 192—58)

The present invention relates to improvements in automatic centrifugal hydraulic flywheels and is useful in connection with automobiles, trucks, busses, submarines, warships of all descriptions, small and large boats, army tanks, trains, and also in connection with large machinery in which internal combustion engines, Diesel engines, electric motors, or other devices for transmitting power in which heavy loads are to be moved.

An object of the invention is to produce a device that may serve as a clutch and transmission to be automatically operated by the speed of the engine or motor and to act to increase the efficiency of the speed and transportation factors of the power plant.

A further object of the invention is to produce a simple and durable construction, silent in operation, with a minimum of wear in the moving parts, and which construction will produce smooth starting, will prevent jerking in starting, particularly where heavy loads are to be moved.

A further object of the invention is to provide an improved device that will prevent stalling of the engine particularly on upgrades with heavy loads.

A further object of the invention is to provide an improved construction that admits of its utility in connection with either light, or heavy duty service that will act to pick up loads slowly irrespective of motor speed, but which will act to put in motion the load to the desired speed within a relatively short space of time.

A still further object of the invention is to take advantage of the power developed by centrifugal force as well as the motive power of the oil or other fluid used in connection with the two relatively rotating parts of the improved hydraulic flywheel.

It is a further object of the invention to discard the shifting of gears or the use of a clutch, or device acting as an automatic transmission.

A further object of the invention is to produce a device at low cost comparatively to production cost of the conventional clutch and transmission and which will serve in a dual capacity for both of these items.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a vertical section, taken on the line 1—1 of Figure 2, illustrating an improved automatic centrifugal hydraulic flywheel constructed in accordance with the present invention.

Figure 6 is a section taken on the line 6—6 in Figure 1.

Figure 8 is a vertical section taken on the line 8—8 in Figure 7.

Figure 9 is a fragmentary vertical section similar to Figure 8 with the parts shown in an advanced position, and Figure 10 is a section taken on an enlarged scale on the line 10—10 in Figure 9.

Figure 1:
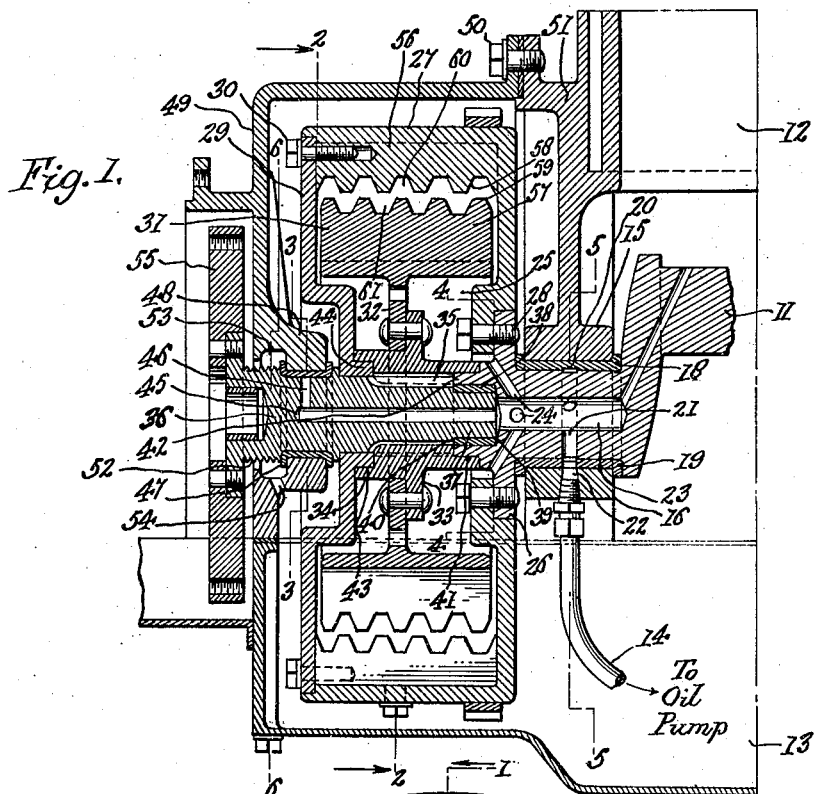

Referring more particularly to Figures 1 to 6 inclusive, 11 designates the crank shaft of an internal combustion engine, of which 12 designates the last or rear cylinder and 13 represents the crank case. The oil pump (not shown) driven continuously by the motor when in operation delivers oil through the oil line 14 to the last or rear bearing 15. This bearing is shown more particularly in Figure 5 in which the bearing 15 has the usual cap 16 removably secured in place by the bolts 17 or other fastenings. The bearing metal is represented at 18 and 19. In this bearing metal and in the adjacent face of the crank shaft is formed an annular groove 20 which communicates by means of one or more radial passages 21 with the oil intake port 22 with which the oil line 14 connects. The radial passages 21 communicate at their inner ends with a central chamber 23 formed in the end of the crank shaft 11.

In this crank shaft and axially displaced from the group of radial passages 21 is a second group of oil passages 24 which communicate at their inner ends with the central chamber 23 and at their outer ends with the central space 25 within the flywheel.

As shown in Figure 1 the oil passages 24 are angular to radii of the crank shaft in order that the outer ends of such passages 24 may deliver oil to the central flywheel space 25.

Figure 4:
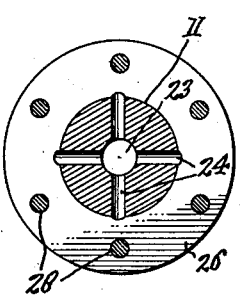
Figure 4 is also a transverse vertical section taken on the line 4—4 of Figure 1.
Figure 5:
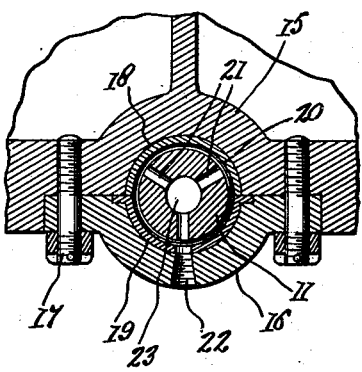
Figure 5 is a similar view taken on the line 5—5 in Figure 1.

Outwardly of the bearing 15, the crank shaft 11 carries a flange 26 to which the flywheel 27 is attached as by the bolts 28 or other fastening means. This construction is also shown in Figure 4. The flywheel 27 is rigidly connected with the crank shaft 11 and constantly rotates therewith.

The flywheel 27 is made hollow and has a removable cover 29 enclosing one side of the same which may be fastened to the flywheel 27 as by the use of bolts or other suitable fastenings 30.

Within the hollow space concentrically arranged with respect to the flywheel is a load member 31 which is freely rotatable within such flywheel. This load member is formed with an inwardly projecting annular web 32 which is connected with an outstanding flange 33 on a collar 34. The collar is keyed, as at 35 to a shaft 36. This shaft 36 has a reduced end 37 rotatably mounted in a bronze or other bearing 38 which is fitted into a recess 39 in the end of the crank shaft 11, which crank shaft extends up to the line 40. The collar or bushing 34 is internally recessed as at 41 to fit over the externally reduced end 42 of the crank shaft. Thus the crank shaft is formed with recesses 39 and 41, one of which is internal and the other external to receive respectively the adjacent end portions of the shaft 36 and the collar or bushing 34 to permit both the shaft 36 and the collar 34 as a keyed unit to rotate with respect to the crank shaft 11. The collar or bushing 34 at its opposite end is internally recessed, as at 43 to be received over and to rotate about a bearing 44 preferably carried by the removable cover plate 29.

Figure 3:
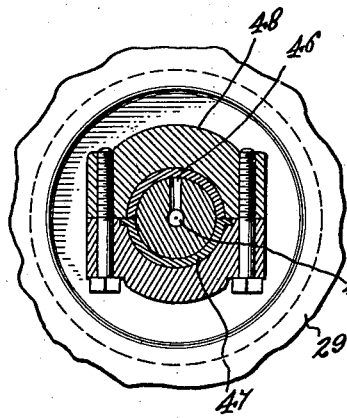
Figure 3 is a similar section taken on the line 3—3 of Figure 1.

Internally the shaft 36 is formed with a bore 45 forming a continuation of the central chamber 28 of the crank shaft. At the left end of the bore 45 is one or more right angular ducts 46 extending substantially radially out through the shaft 36, as shown in Figure 3, to deliver oil or lubricant to a bearing 47 which is mounted in a bearing boss 48 carried by the external fixed flywheel cover 49. This cover is removably affixed, as by bolts 50 to a part of the engine block 51. Leakage of oil from bearing 47 toward the left will encounter the reversely turned screw threads 52 which will have a tendency to force the oil back and to throw it outwardly into an annular compartment 53 having a discharge port 54 at the bottom communicating directly with the forward part of the crank case 13 by which the oil after circulating through the bearing 47 may be returned to the oil pump. In a similar way leakage of oil from the bearing 47 toward the right will be directly delivered back into the crank case.

Figure 2:
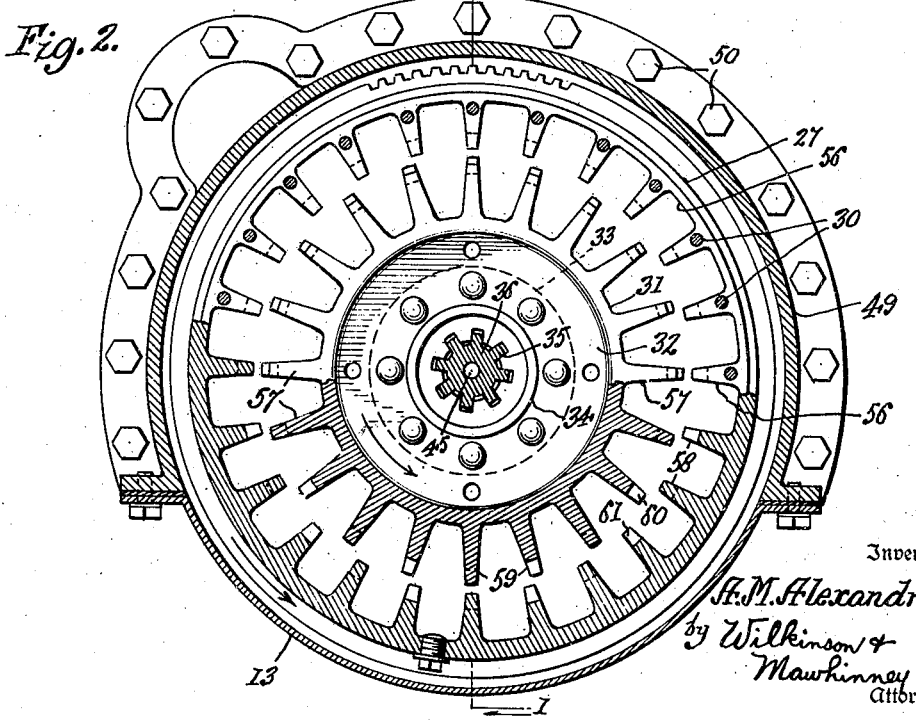
Figure 2 is a transverse vertical section taken on the line 2—2 of Figure 1.
Figure 7:
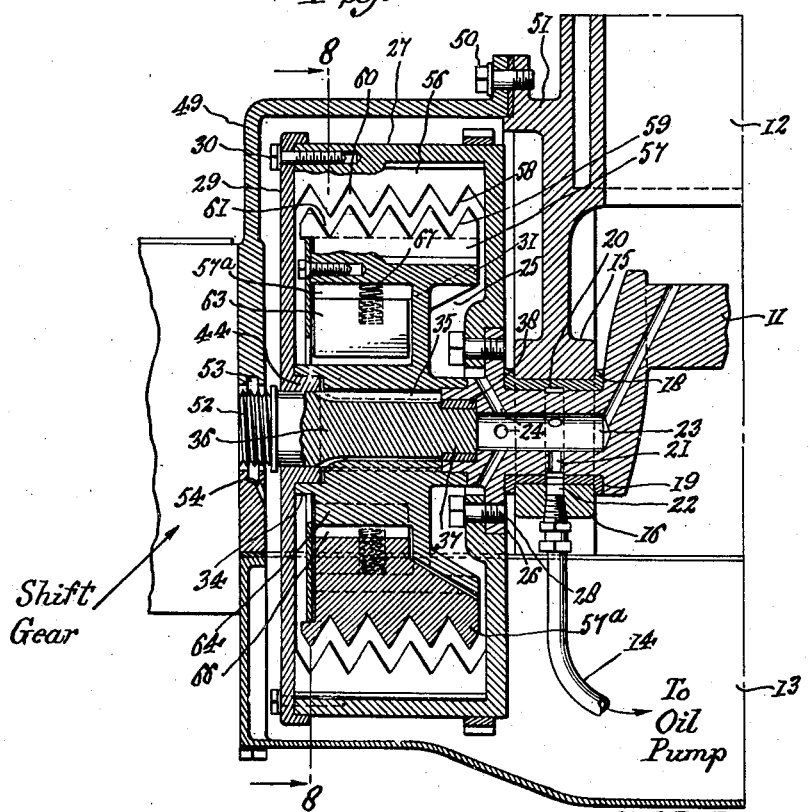
Figure 7 is a view similar to Figure 1 showing a modified form of the device.

The shaft 36 at its left end may, if desired, carry a clutch plate 55 for connection to any usual form of clutch and transmission, this being particularly desirable for extra heavy loads. However, the clutch plate may be dispensed with, as shown in Figure 7, and the shaft 36 will be directly coupled to a shift mechanism which will serve for forward or backward drives or neutral position. Between the mutual edges of the flywheel 27 and the load member 31 are reaction members 56 and 57. These members are spaced from one another circumferentially around the flywheel and load member, as shown in Figure 2. The adjacent edges of the reaction members 56 and 57 are formed, as shown in Figure 1, with series of teeth 58 and 59. The teeth are separated by spaces 60 and 61 of the general form of the teeth, the spaces 60 being disposed radially opposite the teeth 59 and the spaces 61 radially opposite the teeth 58. The teeth may be of a generally triangular form or of a V-shape with their apexes removed as indicated in Figures 1 and 2 or left intact as shown in Figures 7 and 10.

From an examination of Figures 1 and 8 it will be apparent that such arrangement of teeth forms a zig-zag line transversely across the opposed edges of the reaction members 56 and 57 which in mechanical effect increases the marginal exposed edges of the two reaction members to multiply the reaction effect between such members, as well as to provide a zig-zag transverse passage between the reaction members through which the oil is forced.

Viewing Figure 2, the reaction members 56 on the flywheel are twenty-four in number which is a satisfactory numerical arrangement; while the opposite reaction members 57 of the load member are twenty in number, which has been found to be a satisfactory numerical arrangement in its relationship to the numerical arrangement of twenty-four of the outer reaction members 56.

It will also be noted from Figure 2 that the angular distance between adjacent circumferential reaction members 56 is less than the angular distance between adjacent circumferential reaction members 57, so that the majority of reaction members 57 will be at all times radially out of step with the reaction members 56 of the flywheel. With this numerical and radial arrangement, only four of the reaction members will coincide radially and this four will be in diametrically opposite pairs. Otherwise stated coincidence between reaction members 56 and 57 occurs at each quadrant of the circle of the two members, that is such coincidence occurs at 90° intervals. Inasmuch as the greatest resistance is encountered at the points of such coincidence of the reaction members 56 and 57, the fact that these points are distributed at regular annular distances around the circle of the flywheel, and that the intermediate reaction members are all out of step; prevents a jerky start and insures a smooth and silent starting of the load from its position of rest.

In this way the inertia of the load is silently, smoothly and yet swiftly overcome to provide a drive of great flexibility.

All of these characteristics are greatly enhanced by the centrifugal force developed in the body of oil or other fluid in the inner or central chamber of the flywheel. This centrifugal force causes the oil to move out at the sides of the load member and to get into the outer part of the flywheel. Such oil is thrown out into the pockets provided between the reaction members 56 of the flywheel and the reaction members 56, which are rotating with the engine, carry such oil around with the flywheel. Also the centrifugal force will supply oil to the pockets between the reaction members 57 of the load member. It will also be remembered that the oil is being furnished under pressure by the pump through the pipe line 14, which not only lubricates both bearings but also supplies necessary oil to the internal central chamber of the flywheel.

As the flywheel rotates incident to its rigid connection to the crank shaft of the engine, it will tend to carry around with it the body of oil enveloping the reaction members 56 and 57. Assuming the load member 31 to be in an origin position of rest, the reaction members 56 will rotate relatively around the reaction members 57, causing the intermediate body of oil to pass through the zig-zag passages between the teeth 58 and 59. The oil carried around in the outer pockets influences the oil in the next inner circular zone and reacts against the reaction members 56 and 57 and particularly against the teeth 58 and 59 thereof which form a series of exposed areas projecting into this entrained rotary volume of fluid. Thus the load member is picked up very quickly, yet smoothly by the outer rotating flywheel and in a short space of time made to acquire the same speed as the flywheel. Before this synchronizing in speed is obtained, however, and while there is relative movement between the flywheel and the load member, the outer reaction members 56 rotate past the inner reaction members 57, and in so doing, such outer reaction members force bodies of oil against the inner members thus causing compression of the oil as the outer members approach and pass the inner members. So soon as an outer reaction member 56 has passed an inner reaction member 57 and recedes circumferentially therefrom, a condition of partial vacuum tends to form behind the flywheel reaction members 56. This condition of partial vacuum tends to cause the reaction member 57 to move up faster to satisfy this partial vacuum. Thus the conditions of pressure on one side and partial vacuum on the other side of the inner reaction members 57 works doubly and continuously throughout the entire circle of the device to cause the inner load member to acquire the speed of the outer flywheel in the shortest space of time yet with smoothness and flexibility. As the reaction members approach and pass one another, the spaces therebetween decrease and increase so as to diminish on the pressure side and enlarge on the vacuum side the port area through which the oil must pass.

It will be understood that the centrifugal action developed by the rotation of the flywheel which causes the oil to seek an outer position against the flywheel and in the pockets thereof between reaction members 56, will also result in a corresponding displacement of the internal air within the flywheel toward the center of such flywheel, up to a point where the flywheel chamber becomes full of oil, such air will be forced out along the shaft 36 and will be permitted to escape into the crank case and into the surrounding air.

Although I have stated as a satisfactory example a ratio of twenty-four to twenty in the reaction members 56 and 57, it will be understood that this is merely by way of example and I do not wish to be limited to such number although the number has special advantages in an intermediate size of device. However, the device might be made in any other numerical ratio.

It will be further understood that the centrifugal force to which the oil in the flywheel is exposed will not only throw the oil out radially to all parts of the reaction members 56 but will also tend to put the oil under compression which will further enhance it as a transmission medium.

The influence of such compressed medium will tend to lock the parts more firmly together when the load member finally acquires the speed of the flywheel.

When the engine speed is reduced the load member will tend to out-run the flywheel and the inner reaction members 57 will rotate relatively to the outer reaction members 56 but the action will be as previously described, the formation of the teeth 58 and 59 tending to act as an effective brake to rapidly slow down the load member.

Referring more particularly to Figures 7 to 10 of the drawings, in this form certain of the inner reaction members 57ª are made slidable in guides 62 of the load member. Preferably the fixed members 57 alternate with the slidable members 57ª. Such slidable members 57ª are carried on the outer ends of weight blocks 63. These weight blocks have lateral guides 64 for guiding same in a radial reciprocating movement. Moreover the weight blocks are preferably guided by ribs 65 projecting out from the collar 34 and engaging in grooves 66 made in the weight blocks 63. The ribs 65 are preferably in radial alinement with the slidable blades 57ª. Coil springs 67 or other suitable devices are employed to bias the weight blocks and blades 57ª to an inner position. The weight blocks 63 are adapted to come under the influence of centrifugal force during the rotary motion of the load member and the load of the springs 67 is so selected that the blades 57ª will move out to a desired outermost position at a predetermined maximum rotational speed of the load member.

Figures 7 and 8 show the retarded position of the blades 57ª while Figures 9 and 10 show the advance or outer position of the same.

With this form of device the starting will be rather slow due to the initial position of the blades 57 leaving gaps of maximum width between the reaction members and their teeth. However, as the speed of the load member increases to a point where the inertia of the weight blocks 63 is overcome and the blades 57ª move outwardly to close up such spaces, the acceleration from this point on will be very rapid and will increase in ratio with the increase in speed of the load member, reaching its maximum when all of the blades 57ª are projected to outermost position. If the outer ends of the blades 57ª are initially in the same circle with the outer ends of the fixed reaction members 57, then the initial or starting movement will be the same as in the first form of the device, but as soon as the load member acquires a predetermined speed of rotation then each alternate blade 57ª will be thrown out proportionately thus increasing the efficiency of the device over the first form and creating a device of increasing acceleration.

In this second form of the device the apexes of the teeth are also left intact which further reduces the port area of the fluid space between the teeth to create a greater grip of the flywheel to the load member.

It is obvious that various changes and modifications may be made in the details of construction and design of the above specifically described embodiment of this invention without departing from the spirit thereof, such changes and modifications being restricted only by the scope of the following claims:

What is claimed is:

1. A combined liquid clutch and flywheel comprising an outer hollow closed member, an inner member within and spaced from the sides of the outer member, reaction blades on the members projecting towards one another and having transverse and radial zigzag continuous spaces opening at the sides of the inner member, a liquid chamber centrally of the outer closed member communicating with the blades and ends of the zigzag spaces through the spaces at the sides of the members, means to supply liquid to said chamber, and means to rotate one member to set up centrifugal motion in the liquid to throw same out in sheets through the side spaces and into the blades and opposite ends of the zigzag spaces.

2. The combination of claim 1 characterized by the fact that it is the outer member that is positively rotated, and means to relieve from said chamber the air pressure generated by the building up of liquid volume centrifugally in the outer part of the closed outer member.

3. An automatic centrifugal combined liquid clutch and flywheel comprising a positively-driven hollow member having in its outer part inwardly-projecting reaction members forming pockets therebetween, a load member rotatably mounted within and free of the hollow member and having mutual outwardly-projecting reaction members, said reaction members constructed and arranged as to their mutual edges to form spaces that are continuous and zigzag in both axial and radial senses, means to supply transmission liquid to said reaction members and to said zigzag spaces, alternate reaction members of the load member being radially movable, lateral guides on the load member for guiding the radial movement of said alternate reaction members, spring means to hold said alternate reaction members in retracted position, grooved centrifugal weight blocks movable radially in said load member and connected to said alternate reaction members, and guides in alinement with the respective alternate reaction members received in the grooves of said blocks.

ALEXANDER M. ALEXANDRESCU.